United States Patent [19]

Felicetti

[11] Patent Number: 4,802,437
[45] Date of Patent: Feb. 7, 1989

[54] EXTERNAL SPEED DISPLAY DEVICE FOR MOTOR VEHICLES

[76] Inventor: Umberto Felicetti, Via Rossini, 8, 87040 Castrolibero (CS), Italy

[21] Appl. No.: 925,957

[22] Filed: Nov. 3, 1986

Related U.S. Application Data

[63] Continuation of Ser. No. 752,429, Jul. 8, 1985, abandoned.

[51] Int. Cl.⁴ .................. G01P 15/06; B60Q 1/54; B60Q 9/00
[52] U.S. Cl. .................... 116/62.4; 116/62.1; 73/491; 73/492
[58] Field of Search ................ 116/32, 37, 38, 57, 116/62.1, 62.3, 62.4, 74; 73/489, 491, 492; 346/18, 33 C, 33 D, 33 TP; 235/97

[56] References Cited

U.S. PATENT DOCUMENTS

| | | | |
|---|---|---|---|
| 1,448,043 | 3/1923 | Tillander | 116/38 |
| 1,594,298 | 7/1926 | Pless | 116/32 |
| 2,193,388 | 3/1940 | Blue | 73/489 |
| 2,409,537 | 10/1946 | Bright | 116/57 |
| 2,909,365 | 10/1959 | Helgeby | 116/62.4 |
| 2,981,585 | 4/1961 | Lower | 346/18 |
| 3,022,130 | 2/1962 | Casiglia | 346/18 |

FOREIGN PATENT DOCUMENTS

| | | | |
|---|---|---|---|
| 65358 | 8/1975 | Australia | 73/491 |
| 623091 | 7/1961 | Canada | 116/62.4 |
| 32705 | 1/1924 | Denmark | 73/491 |
| 233396 | 6/1910 | Fed. Rep. of Germany | 346/18 |
| 2718681 | 11/1978 | Fed. Rep. of Germany | 73/489 |
| 2921676 | 12/1980 | Fed. Rep. of Germany | 116/37 |
| 2283443 | 4/1976 | France | 73/489 |
| 716862 | 10/1966 | Italy | 73/491 |
| 928230 | 5/1982 | U.S.S.R. | 73/491 |

Primary Examiner—William A. Cuchlinski, Jr.
Assistant Examiner—W. Morris Worth
Attorney, Agent, or Firm—Beveridge, DeGrandi & Weilacher

[57] ABSTRACT

A device for displaying and recording the speed of motor vehicles suitable for application to the front and rear bumpers of automobiles is described, consisting of an indicator 1 whose movement is dependent on the speed of the vehicle and which activates internal and external visual and/or acoustic alarm signals whenever the maximum speed limit is exceeded; said indicator also consisting of a triangular-sectioned thread that causes a slit or groove to be made on a sheet 4 of soft plastic for the ascertainment of speed at the moment of collision or accident; and a cable 10 for laterally connecting the front and rear boxes 7 and 7' providing the ascertainment in case of eventual lateral collision.

6 Claims, 4 Drawing Sheets

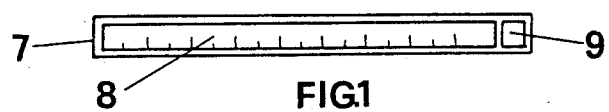
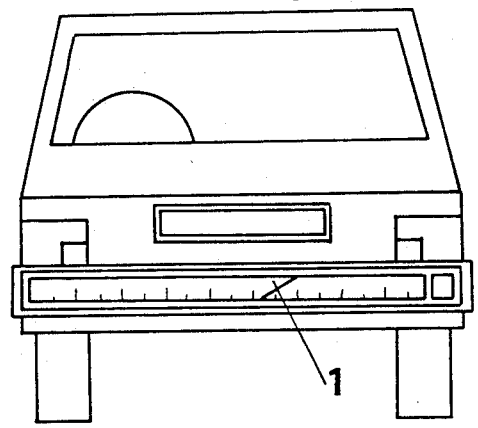
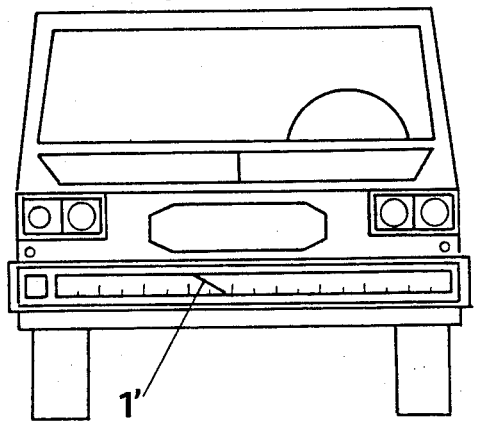

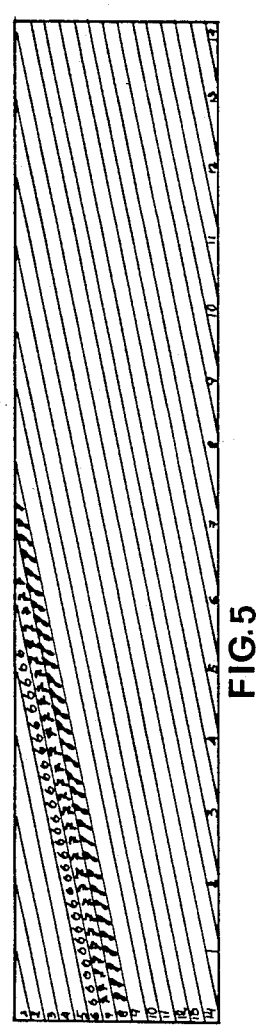
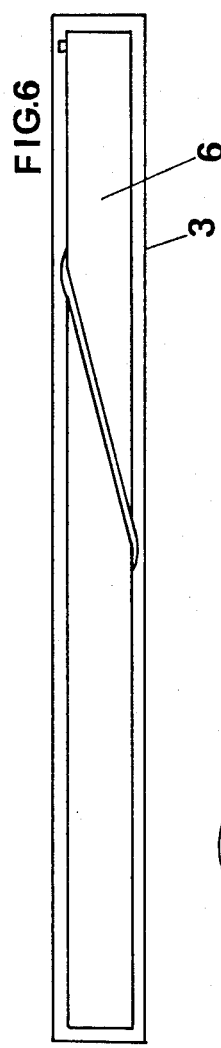
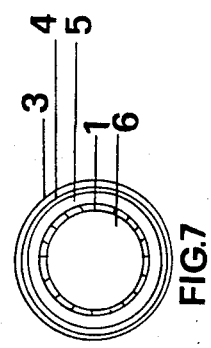

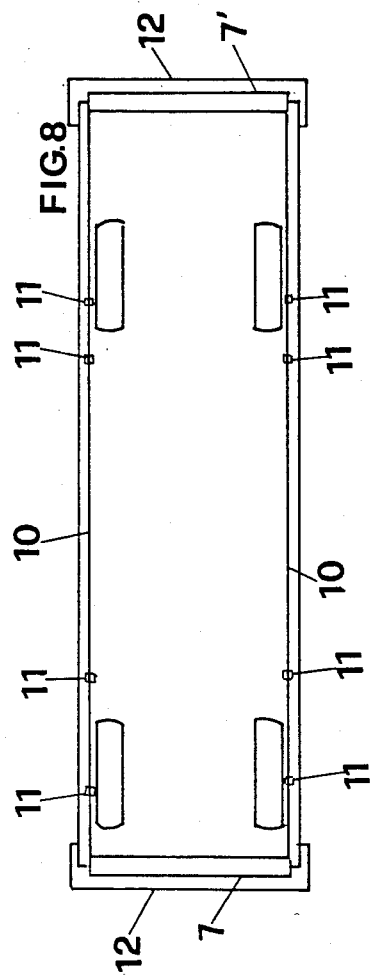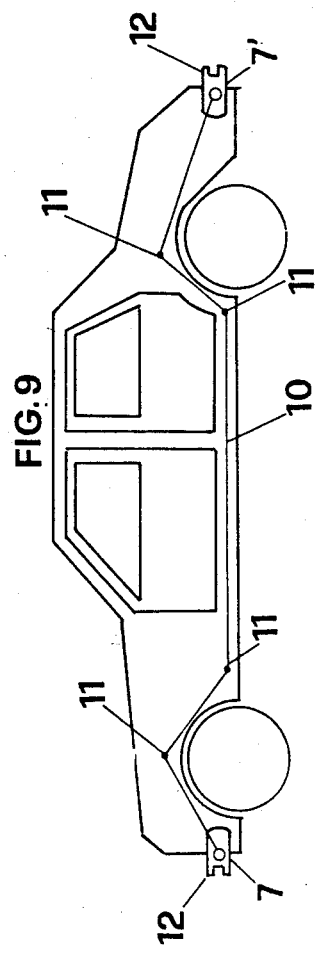

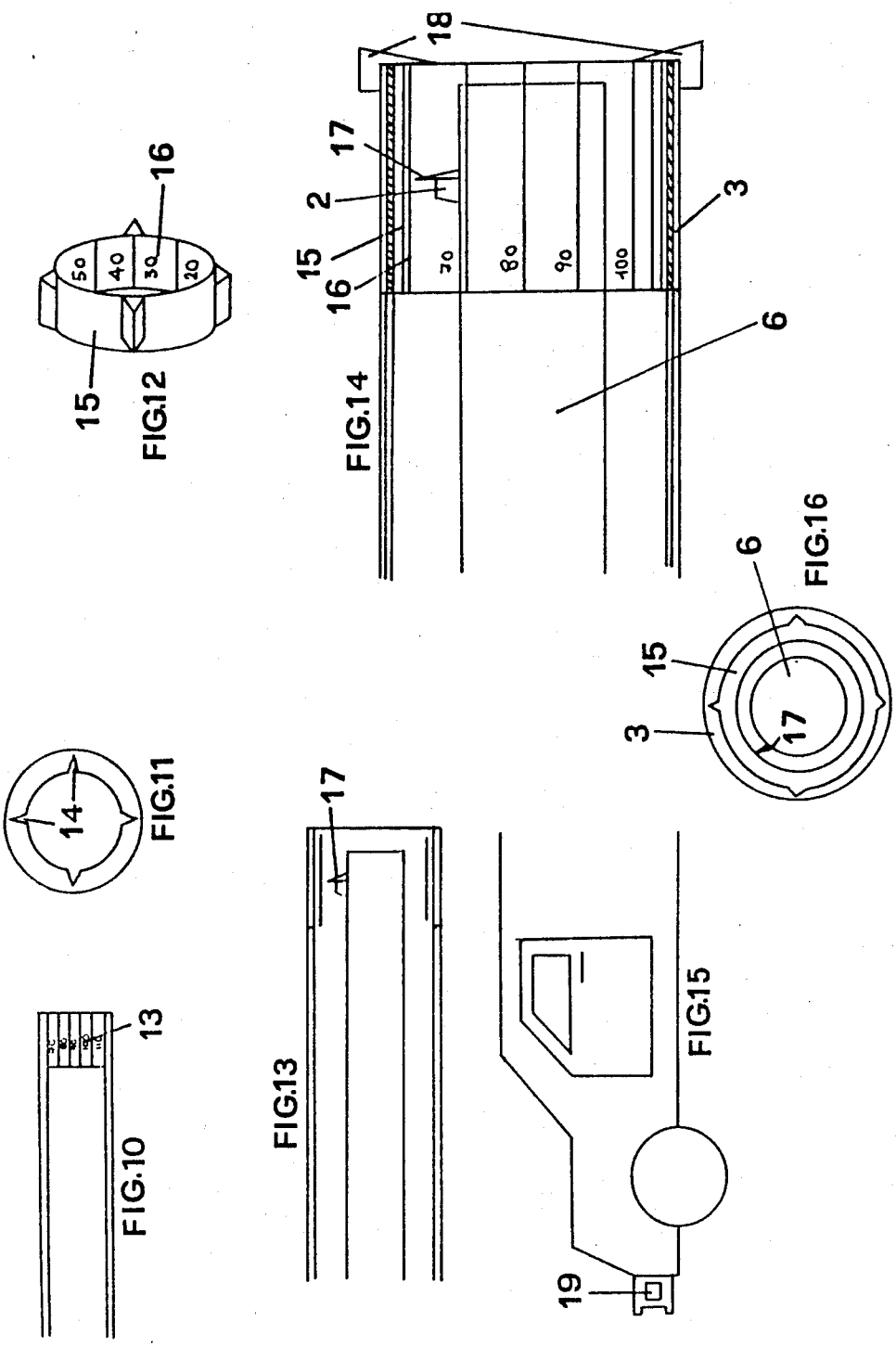

EXTERNAL SPEED DISPLAY DEVICE FOR MOTOR VEHICLES

This application is a continuation of application Ser. No. 752,429, filed July 8, 1985, now abandoned.

The present invention concerns a device for the external display of the speed of automobiles for allowing the ascertainment of the speed in case of collision.

It is known that a motorist on the road can only provide two types of information; he can let others know if he is braking, or that he is going to pass, or that he is going to turn right or left. If he brakes, one is not able to know how hard he is braking nor how much he can diminish the distance with respect to an overtaking car.

From a distance one cannot even tell if the car is moving or not, or if the speed of the car behind is double or triple his own. If he passes it could be untimely. Therefore the motorist in the car ahead of us can tell us if he is applying the brakes, passing or turning, but he cannot signal the most important thing, that is the speed at which he is travelling. If we knew his speed, in fact, we would be able to see if it was decreasing and if so by how much. Knowing the speed of the car in front of us would enable us to react correctly even if the driver neglected to signal a turn or pass.

In so far as speed is perhaps the element that most undermines the safety of travellers on the road, the invention resolves a problem that until now has been totally neglected. Since it offers primary information for the prevention of accidents, namely the automatic and constant "declaration" of travelling speed, it puts a stop to misleading and dangerous visual evaluation of the speed of other vehicles.

The device, according to the invention, has the dimensions of a normal car bumper and can be positioned either under or over the front and rear bumpers of motor vehicles.

It consists of a rectangular dial, longitudinally graduated, along which an indicator, appearing as a coloured band with an upward pointing asymetrical point moves, getting longer as speed increases and shorter as speed decreases. This visual effect is determined by the rotation of a shaft, coloured diagonally, situated behind the graduated slot of the dial, and is activated by forces that depend on speed.

In a slightly different version the indicator is orange in colour, easily visible form a distance during the day, illuminated at night, advancing from left to right and intensifying in colour as the speed of the vehicle increases.

The dimensions of the invented device are expected to correspond to the width of the motor vehicle to which it will be attached in order to ensure the best visibility.

The device, in addition, serves a second purpose: it is equipped with a mechanism that activates, by electrical contact, a flashing light situated on the extreme right whenever the indicator exceeds the maximum speed allowed that type of vehicle. At the same time an internal acoustic signal or luminous intermittent dial located on the instrument panel is also activated. By means of such a device both the driver and others are warned that the vehicle is travelling above the speed limit and is therefore in dangerous conditions.

The eventual choice of the colour blue for the flashing light outside is suggested by the blue flashing lights normally used by emergency vehicles (ambulances etc.).

And finally a third function is performed by the device. It is realized in such a way that in case of collision the consequent deformation of the vehicle causes the instant blocking of the speed indicator at the moment of collision. This enables us to reveal the exact speed of motor vehicles involved in accidents at the moment of impact. This result is obtained by means of a shaft-indicator that rotates inside a cylindrical tube of rigid transparent plastic which is coaxial to it and slightly larger in diameter. This, in turn, is fixed to the frame of the vehicle. The external surface of this tube is graduated while the internal surface is lined with a sheet of soft transparent plastic. The shaft has a sharp triangular toothed thread running along the helical line separating the orange from the neutral colour. Following deformation caused by collision, the tube will exert pressure, directly proportional to the force of impact, causing the internal surface of the tube to contact the toothed thread in one or more points. In those points, because the surface is impressionable, it will groove due to the wedging effect of the corner of the thread, as it happens in a nut for bolts and screws.

The external surface of the tube is graduated in helical lines, one for every degree of speed, parallel to the helix of the toothed thread. Every speed indicating numeral is repeated at a close distance along the whole helical line. In such a way even if worse comes to worse and vehicle disintegrates, it will always be possible to find a piece of the grooved tube. The groove location will mark a number which will be equivalent to the speed of the vehicle at the moment of impact.

In order to be efficient in the case of lateral collisions as well the invention provides for the presence of a thin steel cable that connects the graduated tubes of the front and rear speedometers. This cable runs along the side of the vehicle inside a conducting tube with pulleys conveniently located in those points where it is necessary to go around the curves of the wheels. In the case of lateral impact the length of the cable will be strained and it will pull the ends of the front and rear graduated tubes together sharply, thus damaging both speedometers which will remain deformed. In this way the invention fulfills its third purpose.

The invention therefore serves three purposes:

(1) it provides an external indication of the speed of a motor vehicle;

(2) it warns the driver as well as others whenever the vehicle exceeds the speed limit;

(3) it records the speed of vehicles involved in accidents at the moment of collision.

By carrying out these functions the device enables us to achieve results which are of great civic value in so far as the device proves to be:

(1) an instrument intended for the regulation of traffic and therefore safety;

(2) an instrument for the exercise of self-discipline and discipline on the road;

(3) an instrument serving the forces of law and order in so far as in the case of accident or collision it performs a function similar to and as important as that of the "black box" used on airliners.

The invention is explained in detail hereinbelow according to the attached drawings which show a preferred embodiment and in which:

FIGS. 1, 2, 3 respectively show an external view of the device and the way it works attached to the front and rear of a vehicle.

FIGS. 4, 5, 6 and 7 show the shaft-indicator, the development of the graduated tube's surface, the shaft-indicator housed in the graduated tube and the transverse section of the complete device.

FIGS. 8 and 9 show a plan and lateral view of the steel cable mechanism, for the ascertainment of lateral collisions.

FIGS. 10, 11, 12, 13, 14, 15 and 16 show a variant of the device for the recording of the maximum speed reached by the vehicles.

Referring to the details of the illustrations, the device consists, as shown in FIG. 1, a housing having a rectangular dial 7 externally graduated at 8 and the flashing blue light 9. Attached to the rear of a vehicle the indicator 1 is pointing to a certain value which corresponds to that indicated by 1' (FIG. 3) in which the device appears on the front of the vehicle.

It should be noted that the device attached to the front bumper, as seen in the rearview mirror of a preceeding vehicle, has a scale which reads from left to right. The flashing light appears on the extreme right exactly as the device attached to the rear bumper appears when seen from behind.

Regarding the internal structure of the device as seen in FIGS. 4, 5, 6 and 7 the device, according to the invention, includes the shaft-indicator 6 with the external thread 1 and a copper foil 2 which acts as a switch contact for activating the flashing blue light and simultaneously the internal visual and/or acoustic signal in response to the rotation of the shaft. The shaft 6 is rotated, in a well known electric, electronic or mechanical way, according to the speed of the vehicle.

In fact, it is evident that when the speed of the vehicle increases, shaft 6 rotates and therefore the helical shape of indicator or thread 1 moves towards the end, being now visible along externally graduated dial 7 so as to provide the externally visible information about the speed.

The graduated tube in FIG. 5 has its surface marked to show values up to 140 km/hr; where 1 is equivalent to 10 km/hr, 2 to 20 km/hr, 3 to 30 km/hr and so on. All are repeated along respective helical lines as is shown with a succession of some of the numbers possible in the sequence. FIG. 7 shows the thickness 3 of the tube, the layer of soft plastic 4 that lines the interior of the tube, the space 5 between the tube and the shaft, the thread 1, and the shaft 6.

The sketches concerning the recordation of vehicle speeds in lateral collisions (FIGS. 8 and 9) show the steel cable 10 stretched between the front speedometer 7 and the back speedometer 7'. The pulleys are indicated by 11, and the bumpers can be provided with hard rubber bumpers to protect the speedometer in case of light impact.

In a variation of the invention the mechanism for activating the visual and/or acoustic alarm could be put on the speedometer on the instrument panel, thus using a mass-produced instrument.

In the variant according to FIGS. 10, 11, 12, 13, 14, 15 and 16 a device is shown for the recording the maximum speed reached so as to provide a control by the police.

In said variant of the present invention, an external graduation 13 is provided on the end part of transparent plastic tube 3, shown in FIG. 10, on the band that corresponds to a foil 2 placed on shaft 6. On this end part, the values related to the ones represented on the helicoid are shown.

In said end band, the tube innerly shows grooves 14, formed in the thickness thereof and shown in FIG. 11, so as to engage toothed ring 15 of little smaller diameter. Said ring 15 carries inner graduated paper 16, the numerals thereof corresponding to the graduations 13.

The shaft-indicator 6, beside the foil 2 that activates the alarm light, has a writing point 17 of graphite or other known kind, placed in light contact with paper 16, inside ring 15. In response to the rotation of shaft 6, the writing point 17 traces a line that continues with the rotation of the same, i.e. according to the speed increase of the vehicle, therefore realizing a positive indication of the maximum speed attained. The complete mechanism is shown in a lateral scheme in FIG. 14 and in section in FIG. 16.

Said mechanism may be blocked by a seal 18.

Said seal that is to be applied to the device for recording the maximum speed attained, will be applied to the vehicles of those who habitually exceed the maximum allowed speed.

For the access, the control and the eventual removing of the device for recording the maximum speed attained, the present invention provides an inspection door 19, shown in FIG. 15, placed at the end of the speedometer, on the outer housing.

For further possible functional variants, the device according to the present invention is provided with: instead of the writing point, a plastic pin pushing a magnetic small disk sliding inside a magnetic groove adhered to the inside of the graduated ring, leaving the same at the maximum value; a small pin being fixed on the shaft, pushing a contrasting tongue indicator (on the principle of the small blocks), allowing only forward movement; a small blade fixed to the shaft for cutting a paper or engraving a graduated plastic foil; a small stick pushing down following skittles.

For economy reasons, one of the two devices on a vehicle may be simplified and just perform the sole function of showing the speed. The other one will perform all functions, comprising the recording of the speed in case of collision from the opposite side, by extending the small cable provided for the lateral collisions along the three free sides of the vehicle.

In the graduated, transparent plastic tube, the soft layer must be soaked with a non-flammable substance so as to reduce any potential collision related fire hazards.

Naturally, the device for recording the speed in case of accident could be of smaller dimensions that the one presented. Moreover, the external speed indicator could be realized in a different form, with different dimensions or even a different way of operating. For example, there could be a series of different coloured blinking lights to which conventional speed limits are assigned or there could be an illuminated digital speedometer.

I claim:

1. A device for indicating the speed of a vehicle and for registering the speed of a vehicle which is involved in a collision, comprising,
   a box member mounted on the outside of a vehicle, said box member being substantially the size of a vehicle bumper,
   means for recording vehicle speed in response to involvement of the vehicle in a collision, said recording means including a cylindrical tube member and a shaft, said cylindrical tube member being mounted on said box member and being visible to other motorists, a first set of graduations for indicating vehicle speed, said graduations being marked in units of vehicle speed, said graduations being visible and extending lengthwise with respect to said box member, said graduations being provided on one of said members, said shaft having indicator means cooperating with said graduations to indicate vehicle speed said cylindrical tube member being transparent and having a deformable inner layer, said shaft being located inside the cylindrical tube member and having a raised external thread formed thereon, said shaft being rotatable relative to said tube member in response to changes in vehicle speed, said thread facing the deformable inner layer, said cylindrical tube member being movable against the thread in response to collision forces sustained by said cylindrical tube member, said external thread being capable of forming an indentation in said inner layer to register the vehicle's speed when a collision moves the inner layer against the thread.

2. A device according to claim 1 wherein a second set graduations are formed on the tube member and are associated with parallel helicoidal lines which extend along the length of the tube member, said tube member having repetitive numerals which are close together and disposed along said lines to facilitate a reading of the speed at collision corresponding to the indentation formed by the thread.

3. A device according to claim 1 having a tensioned cable connected to said tube member and extending along the sides of the vehicle, said tensioned cable providing means for moving said tube member against the thread in response to a lateral collision sustained by the vehicle.

4. A device according to claim 1 wherein one end of said tube member is provided with a paper and a writing point is movable in response to rotation of said shaft to produce a trace on the paper indicative of the maximum speed attained.

5. A device according to claim 1 wherein said tube member has an end provided with a second set of graduations for indicating speeds corresponding to the speeds indicated by said first set of graduations.

6. A device according to claim 1 wherein one end of said tube member is provided with a toothed ring with an interior surface, a second set of speed indicating graduations formed on a piece of paper on said interior surface of the toothed ring, said piece of paper having numerals which correspond to the speeds indicated by said first set of graduations said second set of graduations cooperating with a writing point to indicate the maximum speed attained.

* * * * *